United States Patent [19]
Linn et al.

[11] 3,868,006
[45] Feb. 25, 1975

[54] SELF-ADJUSTING RELEASE MECHANISM FOR FRICTION CLUTCHES

[75] Inventors: Donald F. Linn, Manlius; George L. Wishart, Syracuse, both of N.Y.

[73] Assignee: Lipe-Rollway Corporation, Syracuse, N.Y.

[22] Filed: May 3, 1973

[21] Appl. No.: 356,723

[52] U.S. Cl. .............................. 192/111 A, 192/98
[51] Int. Cl. ...................... F16d 11/02, F16d 13/75
[58] Field of Search ........................... 192/98, 111 A

[56] References Cited
UNITED STATES PATENTS

| | | | |
|---|---|---|---|
| 2,439,611 | 4/1948 | Nabstedt | 192/98 X |
| 2,863,537 | 12/1958 | Root | 192/98 X |
| 3,179,217 | 4/1965 | Root | 192/98 X |
| 3,221,854 | 12/1965 | Jaeschke et al. | 192/111 A X |
| 3,433,341 | 3/1969 | Bohn et al. | 192/98 X |
| 3,478,853 | 11/1969 | Kraeplin | 192/111 A |
| 3,489,256 | 1/1970 | Binder et al. | 192/98 |

Primary Examiner—Samuel Scott
Assistant Examiner—Lance W. Chandler
Attorney, Agent, or Firm—Burns & Jenney

[57] ABSTRACT

A self-adjusting release mechanism for disengaging a friction clutch. As wear occurs on the clutch disc facings, repositioning of parts of the release mechanism is required for proper operation. The mechanism includes telescoping sleeves with one sleeve engaging the release levers and the other sleeve carrying the release bearing. Means, including a finger washer, are provided to releasably lock the two sleeves together. When the wear on the disc facings reaches a particular point, other means operate to unlock the locking means whereby relative axial movement can occur between the sleeves to compensate for the wear.

6 Claims, 3 Drawing Figures

SELF-ADJUSTING RELEASE MECHANISM FOR FRICTION CLUTCHES

BACKGROUND OF THE INVENTION

This invention relates generally to clutch release or throw-out mechanisms, and has particular reference to a novel self-adjusting release mechanism that automatically compensates for friction disc facing wear.

In friction type clutches, the driven disc or discs are disengaged from the driving flywheel and pressure plate by actuation of the release levers which are in turn actuated by axial movement of the release mechanism. Movement of the release mechanism is normally effected by a yoke member connected through a linkage to the clutch pedal of the vehicle. In engaged condition, the clutch driving and driven members are urged into engagement by pressure springs and as wear occurs on the clutch disc facings, these springs move the pressure plate closer to the flywheel.

The inward movement of the pressure plate results in a force which tends to change the normal position of the associated release levers and release mechanism and thereby to change the adjustment required for proper operation. Thus, if the free ends of the levers and the release mechanism move inwardly with the pressure plate, this may cause binding between the release bearing and yoke member or at some other point. If, on the other hand, the release mechanism is held against inward movement, binding may occur between the lever ends and spider portion of the release mechanism.

In the past, periodic manual adjustment of the operating mechanism has been required to compensate for wear. In one type of clutch, this is accomplished by changing the angle of the yoke member. In another type, the release lever spider includes a sleeve threadedly mounted on one end of a second sleeve having the release bearing mounted on its opposite end. This permits relative axial movement between the sleeves whereby the distance between the release lever ends and yoke member can be changed to compensate for wear. A release mechanism having manual adjustment means of this last-mentioned type is disclosed in U.S. Pat. No. 2,863,537 to Root, owned by the assignee of the present invention.

The only self-adjusting clutch release mechanism known to the applicants is disclosed in U.S. Pat. No. 3,433,341 to Bohn et al. In this patent, the mechanism includes a collapsible or extendible release bearing carrier with ball bearings retained in an angled cavity of a sleeve member surrounding the carrier, permitting the assembly to controllably collapse or extend to reposition the release bearing with respect to the clutch. The mechanism is more complex than that of the present invention and appears to be considerably more expensive to manufacture.

SUMMARY OF THE INVENTION

The self-adjusting release mechanism disclosed herein includes a first sleeve axially slidable on the driven or output shaft of the clutch and carrying the release bearing at one end. A second sleeve is mounted for axial sliding movement adjacent the other end of the first sleeve, the second sleeve carrying lugs engageable with the ends of the release levers for actuating same. The two sleeves are normally releasably connected together to prevent relative axial movement by a finger washer having radial fingers that project inwardly into engagement with the periphery of the second sleeve, the washer being held at its circumference by a support member fixed on the first sleeve.

When the wear on the clutch disc facings reaches a particular point, a release or unlocking element on the second sleeve operates to disengage the fingers from the second sleeve and permit relative axial movement between the sleeves to compensate for the wear. The unlocking member is normally axially movable with the second sleeve but includes means to limit its inward travel whereby more than normal inward travel of the second sleeve causes the fingers to be brought into engagement with the unlocking element and disengaged from the second sleeve.

BRIEF DESCRIPTION OF THE DRAWINGS

FIG. 3 is a front elevation of a 90° sector of the finger washer of the mechanism.

DESCRIPTION OF THE PREFERRED EMBODIMENT

Figure 1:
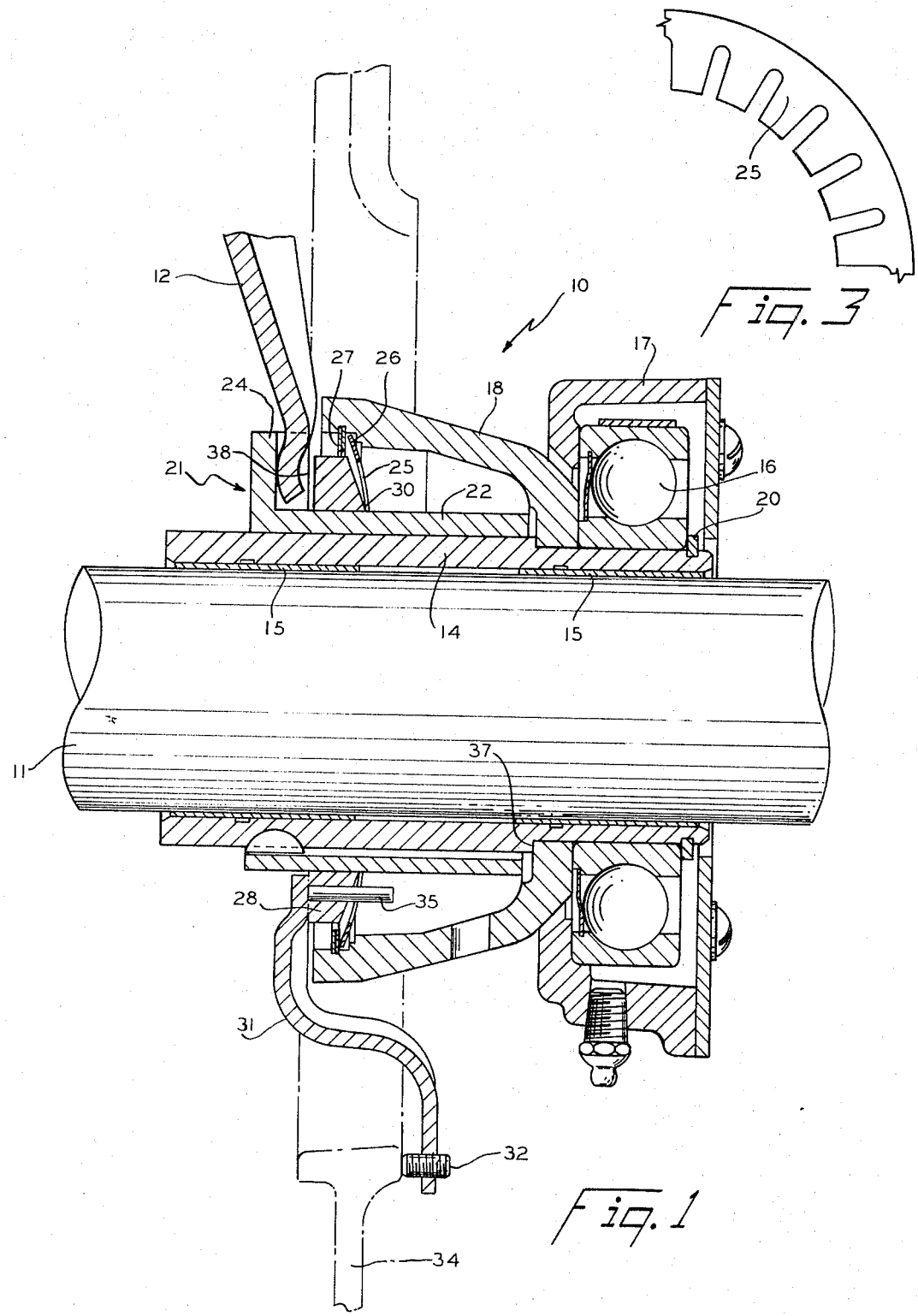
FIG. 1 is a vertical section through the clutch release mechanism of the invention.

Referring now to the drawings, the release mechanism that is shown forms a part of an otherwise conventional friction clutch such as that disclosed in Root U.S. Pat. No. 2,863,537, cited above. Accordingly, reference may be had to the Root patent for a description of the function and operation of the conventional clutch components, including the driven discs on the facings of which wear occurs.

The release mechanism, generally indicated at 10, is mounted for axial sliding movement on the driven or output shaft 11 and the inner (forward) end of the mechanism is in engagement with release levers 12 for actuation of same. The mechanism shown is for a pull type clutch meaning that it must be moved rearwardly or to the right in FIG. 1 to disengage the clutch. Such movement operates through the release levers to move the pressure plate (not shown) rearwardly and causes the driving connection between the driving and driven members to be disengaged.

Release member 10 includes a first or inner sleeve 14 separated from the driven shaft 11 by a pair of bushings 15. Mounted on the rear end of sleeve 14 is a release bearing 16 including the bearing housing 17. The inner race of the bearing is held on the sleeve by a bell member 18, to be described, on one side and a retaining ring 20 on the other side.

A release lever spider 21 is slidably mounted on sleeve 14 adjacent its forward end, the spider comprising a sleeve 22 and a plurality of circumferentially spaced U-shaped lugs 24 for receiving the inner ends of the release levers 12. In accord with the invention, relative axial movement between the inner and outer sleeves 14,22 is normally prevented by a finger washer 25, FIGS. 1 and 3, that is supported at its circumference by bell member 18, the outer edge of the washer being clamped between an internal shoulder 26 in the bell and retaining rings 27 as shown. Washer 25 is dished or slightly bowed in one direction and, as best shown in FIG. 3, has a plurality of inwardly projecting radial fingers the ends of which grip the outside diameter of the spider sleeve 22.

The fingers of washer 25 can be disengaged from sleeve 22 (in a manner to be presently described) by means of an unlocking ring 28 that is slidably mounted on the sleeve. The rear side of ring 28 is bevelled to provide a relatively sharp inner rear edge 30 that is normally positioned close to or in contact with the inner ends of the washer fingers but does not exert any force against them.

Figure 2:
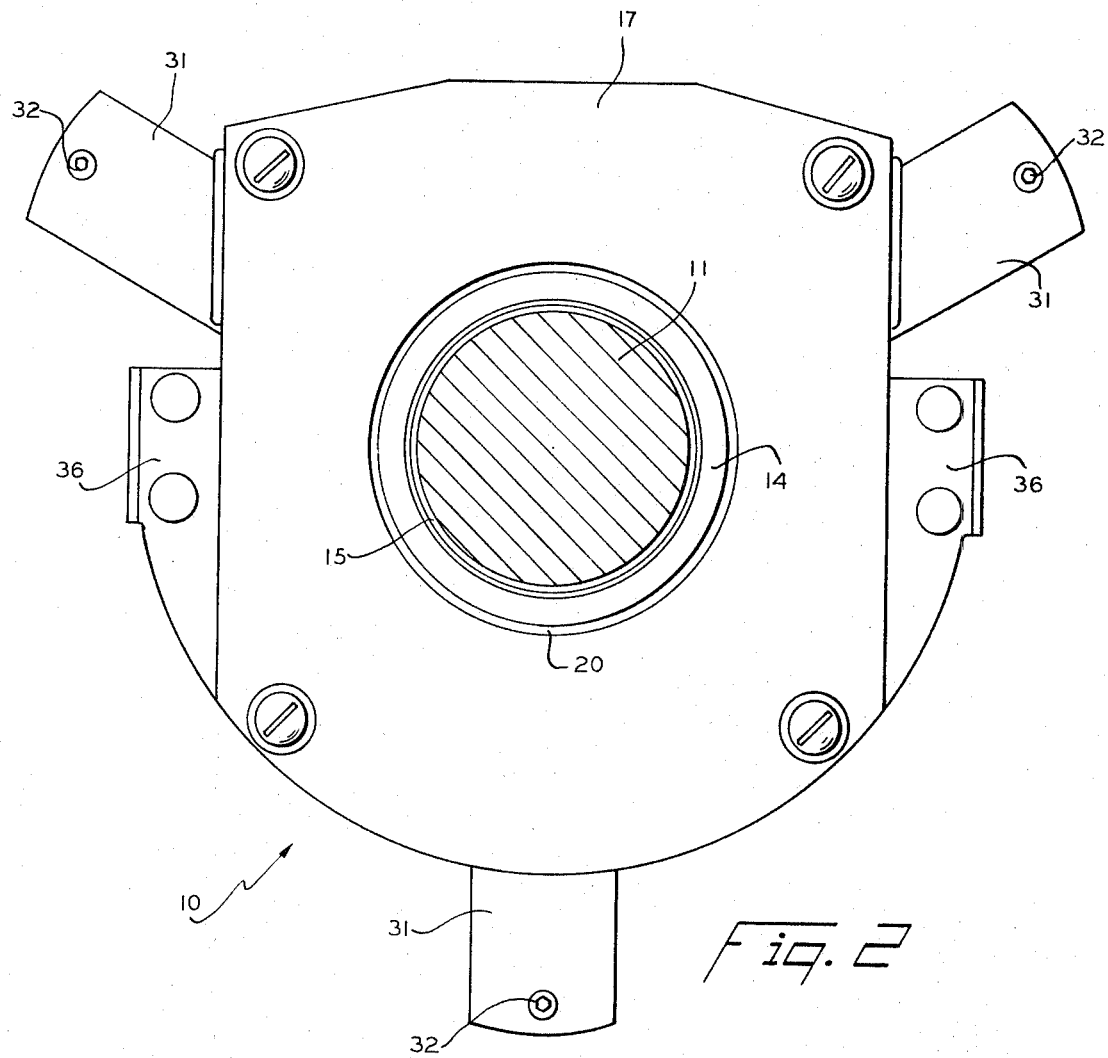
FIG. 2 is a right side elevation of the release mechanism.

Secured to the front side of ring 28 are three circumferentially spaced arms 31, FIGS. 1 and 2, which project radially outwardly from the ring. The arms 31, which have a reverse bend in profile, are provided at their outer ends with set screws 32 adapted to abut against the clutch cover 34, shown fragmentarily in phantom lines, when the clutch is engaged. During initial adjustment of the release mechanism, the screws 32 are adjusted so as to just contact the cover when the rear edge 30 of unlocking ring 28 is positioned closely adjacent the washer fingers as above described. To prevent any relative rotation between the unlocking ring and finger washer, the ring is provided with a rearwardly projecting dowel 35 that passes through the washer between an adjacent pair of fingers as best shown in FIG. 1.

In normal operation of the release mechanism, without consequential wear on the driven disc facings, disengagement of the clutch is as follows: Release mechanism 10 is moved to the right or rearwardly by a clutch pedal actuated yoke (not shown) which engages a pair of side lugs 36, FIG. 2, on the release bearing housing 17. The yoke pull is transmitted through the release bearing 16, retaining ring 20 and inner sleeve 14 to the bell member 18, the latter being clamped between an external annular shoulder 37 on the sleeve and the inner race of the bearing as shown in FIG. 1. The rearward movement of bell 18 is transmitted through finger washer 25 to the spider 21 whereby the release levers are actuated to disengage the clutch. When the spider 21 moves, unlocking ring 28 is moved along with it because, even though the ring is slidably mounted on the spider sleeve, it will be engaged by the rear edges 38 of the lugs 24.

When the clutch pedal is released, the release mechanism will be returned to its starting position in the conventional manner to re-engage the clutch.

When the wear on the disc facings is no longer inconsequential so that adjustment is required, the adjustment is automatically made during re-engagement of the clutch, or as the release mechanism moves forwardly (to the left in FIG. 1). Thus, when the release levers 12 reach their starting position, the arms 31 on the unlocking ring 28 contact the clutch cover and prevent further forward movement of the ring. Due to the wear, however, the pressure plate and attached release levers are able to move farther forward toward the flywheel and are strongly urged to do so by the usual pressure springs (not shown) acting on the pressure plate. This causes the free ends of the release levers to continue to urge spider 21 forward whereby the ends of the washer fingers are pressed against the rear edge 30 of the unlocking ring which causes the grip of the fingers on the spider sleeve 22 to be released.

With the finger washer grip on the spider sleeve released, the spider can move forward to a new position dictated by the pressure plate and release levers. On the next rearward movement of the release mechanism to disengage the clutch, the finger washer grip on the spider sleeve is re-established and further relative movement between sleeves 22 and 14 is prevented until further wear on the disc facings reaches the point where another adjustment is called for.

From the foregoing description it will be apparent that the invention provides a novel self-adjusting release mechanism that can effectively reduce vehicle down time and maintenance costs. As will be understood by those familiar with the art, the invention may be embodied in other specific forms without departing from the spirit or essential characteristics thereof.

We claim:

1. In a friction clutch for connecting driving and driven shafts, the clutch having means for normally effecting a driving connection between the shafts and release levers actuatable to disengage said driving connection, the improvement comprising a first sleeve member axially slidable on the driven shaft, a second sleeve member axially slidable on the first sleeve member, means on the second sleeve member engageable with the release levers for actuating same, releasable means normally connecting the first and second sleeve members together to prevent relative axial movement therebetween whereby axial movement of the first sleeve member in one direction operates to correspondingly move the second sleeve member and actuate the release levers, and independent means located adjacent the releasable sleeve connecting means and operable when the driving connection wears to release the sleeve member connecting means and permit relative axial movement between the members to compensate for the wear.

2. A friction clutch as defined in claim 1 wherein the releasable sleeve connecting means includes an annular support member mounted on and axially movable with the first sleeve member, and a finger washer supported at its circumference by said support member, the finger washer having a plurality of inwardly projecting radial fingers normally engaging the circumference of the second sleeve member.

3. A friction clutch as defined in claim 1 wherein the means operable to release the sleeve member connecting means includes an annular member mounted on and normally axially movable with the second sleeve member, and means connected to said annular member to positively limit the extent of its axial movement in one direction.

4. In a friction clutch for connecting driving and driven shafts, the clutch having means for normally effecting a driving connection between the shafts and release levers actuatable to disengage said driving connection, the improvement comprising a first sleeve member axially slidable on the driven shaft, a second sleeve member axially slidable on the first sleeve member, means on the second sleeve member engageable with the release levers for actuating same, a support member fixed on the first sleeve member, a finger washer carried by the support member in encircling relation to the second sleeve member, the washer having a plurality of inwardly projecting radial fingers that normally engage the second sleeve member and prevent relative axial movement between the sleeve members whereby axial movement of the first sleeve member in one direction operates to correspondingly move the second sleeve member and actuate the release levers, and a release member mounted on the second sleeve member adjacent the washer fingers, the release member being operable when the wear on the clutch driving connection reaches a particular point to disengage the fingers from the second sleeve member and permit relative axial movement between the sleeve members to compensate for the wear.

5. A friction clutch as defined in claim 4 wherein the release member on the second sleeve member is normally axially movable with the member, the release member including means to positively limit the extent of its movement in one direction.

6. A friction clutch as defined in claim 5 including a cover, and wherein the movement limiting means of the release member comprises at least one outwardly projecting arm arranged to abut against the cover.

* * * * *